United States Patent [19]

Shifferly

[11] Patent Number: 5,067,236
[45] Date of Patent: Nov. 26, 1991

[54] METHOD FOR MANUFACTURING AN AUTOMATIC TIRE MOUNTING AND DEMOUNTING MACHINE ROLLER

[76] Inventor: Richard E. Shifferly, 9717 Waterville-Neapous Rd., Waterville, Ohio 43566

[21] Appl. No.: 403,386

[22] Filed: Sep. 6, 1989

Related U.S. Application Data

[63] Continuation of Ser. No. 250,527, Sep. 9, 1988, abandoned, which is a continuation of Ser. No. 247,281, Oct. 15, 1981, abandoned.

[51] Int. Cl.[5] .............................................. B21D 53/00
[52] U.S. Cl. ................................................ 29/895.3
[58] Field of Search ....................... 157/1.1, 1.17, 1.2, 157/1.22, 1.24, 1.3; 29/110, 148.4 R, 116.1, 122, 123, 124, 125, 150, 895, 148.4 D

[56] References Cited

U.S. PATENT DOCUMENTS

| | | | |
|---|---|---|---|
| 2,569,789 | 10/1951 | Weaver | 157/1.24 |
| 2,661,053 | 12/1953 | Mullen | 157/1.1 |
| 2,665,747 | 1/1954 | Harrison | 157/1.24 X |
| 2,900,018 | 8/1959 | Harrison | 157/1.24 |
| 2,929,089 | 3/1960 | Nall | 29/122 X |
| 3,029,860 | 4/1962 | Schultz et al. | 157/1.22 |
| 3,545,463 | 12/1970 | Mueller | 157/1.24 |
| 3,736,199 | 5/1973 | Mason | 29/110.5 X |
| 4,107,830 | 8/1978 | Thomson | 29/110.5 |
| 4,197,624 | 4/1980 | Lass | 29/122 X |
| 4,403,640 | 9/1983 | Schifferly | 157/1.3 |
| 4,830,079 | 5/1989 | Onuma | 157/1.24 |

*Primary Examiner*—Mark Rosenbaum
*Assistant Examiner*—Frances Chin
*Attorney, Agent, or Firm*—George R. Royer

[57] ABSTRACT

A roller for an semiautomatically or automatically actuated tire mounting and demounting machine flexibly equipped for mounting tires on rims of all configuration, said mounting machine comprising working elements which mount a resiliently composed tire on a rim. The roller herein may also be used in connection with semiautomatically operated tire mounting and demounting tools, and other types of tire mounting machines in which a roller is utilized. The roller herein has upper and lower portions respectively of which lower portion is shaped in the form of an inverted truncated cone, and integrally situated on the top of such lower portion is a circular member of a diameter which is larger than any part of the lower portion of such roller. The outer circumferential periphery of the upper member is rounded in a convex manner, such outer peripheral circumferential convex surface being formed by a method of manufacture using two distinct radii, one of which radii forms the lower rounded surface and the other forming the upper part of the convex surface of such upper portion.

2 Claims, 7 Drawing Sheets

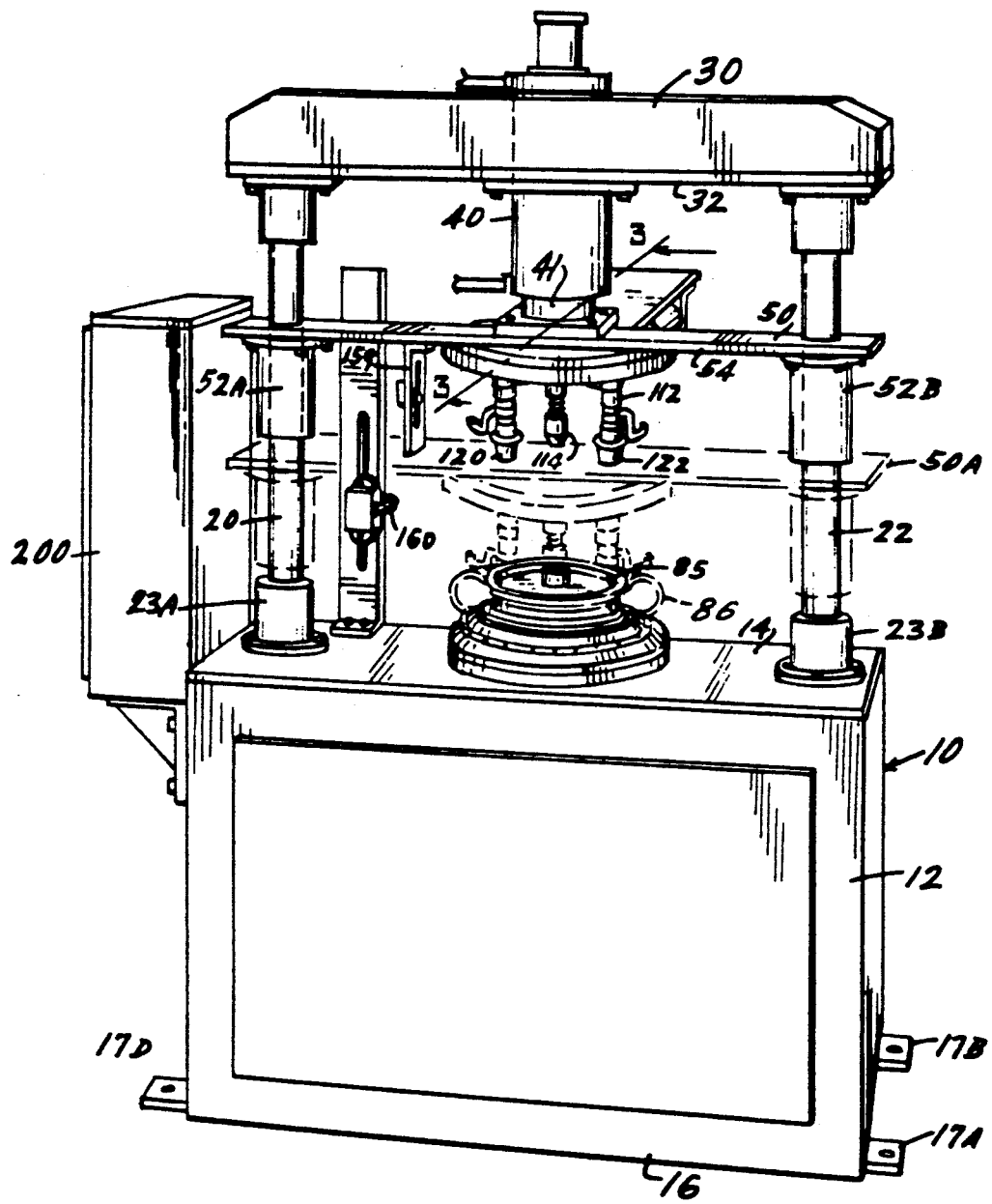
FIG-1-
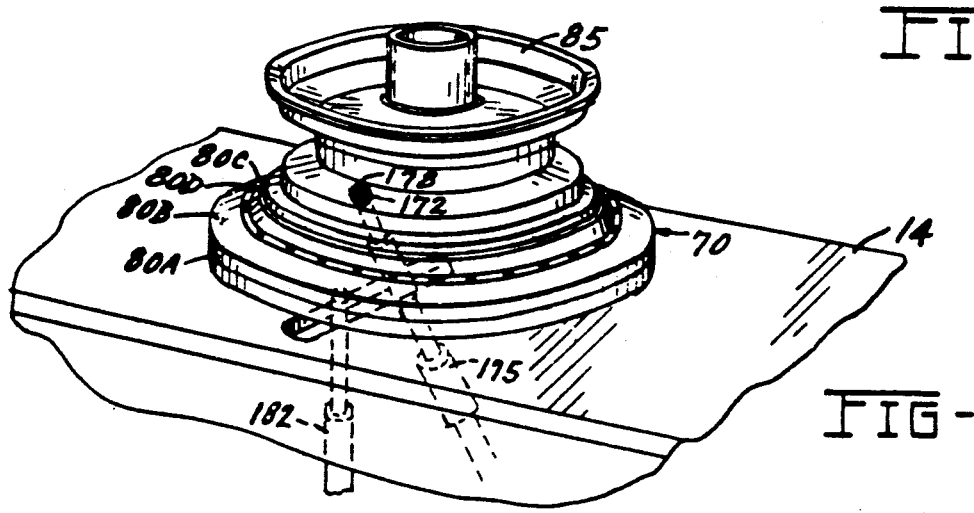
FIG-2-

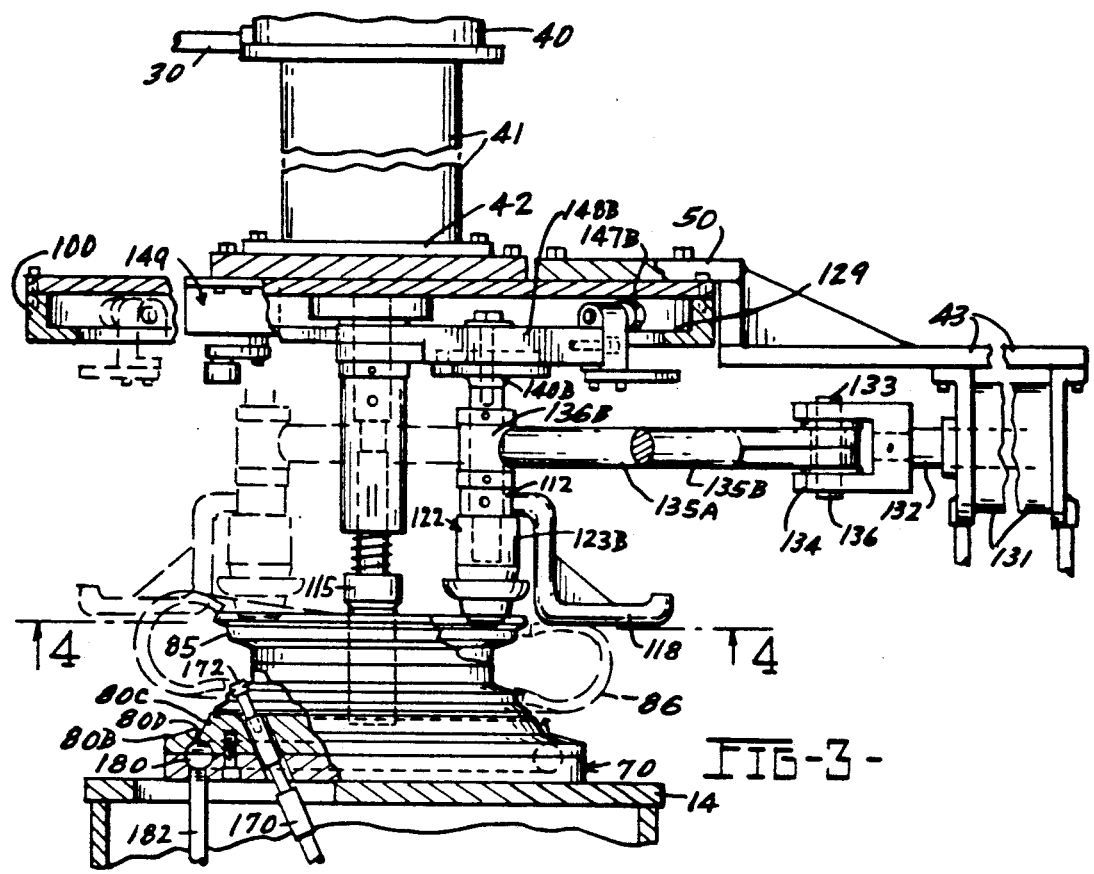
FIG-3-
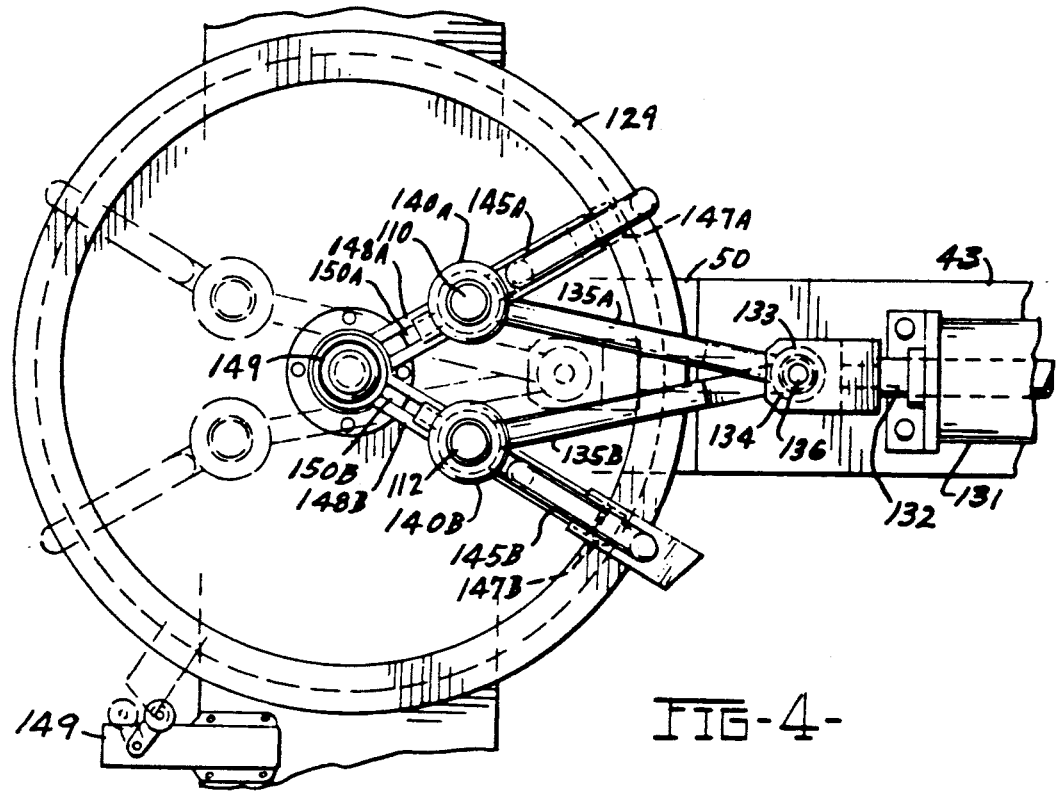
FIG-4-

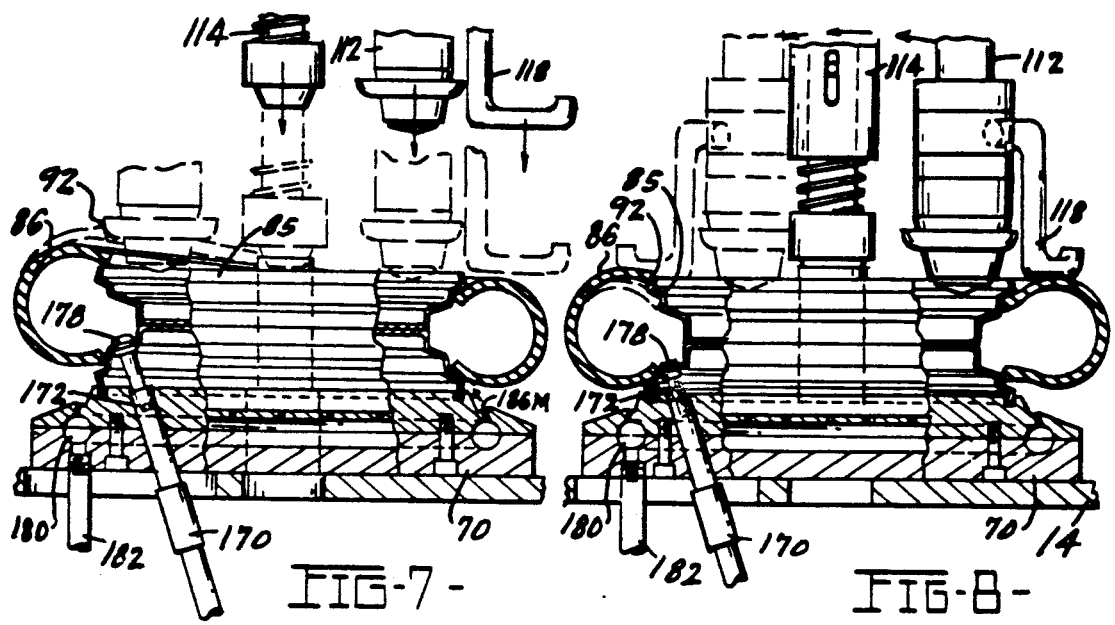
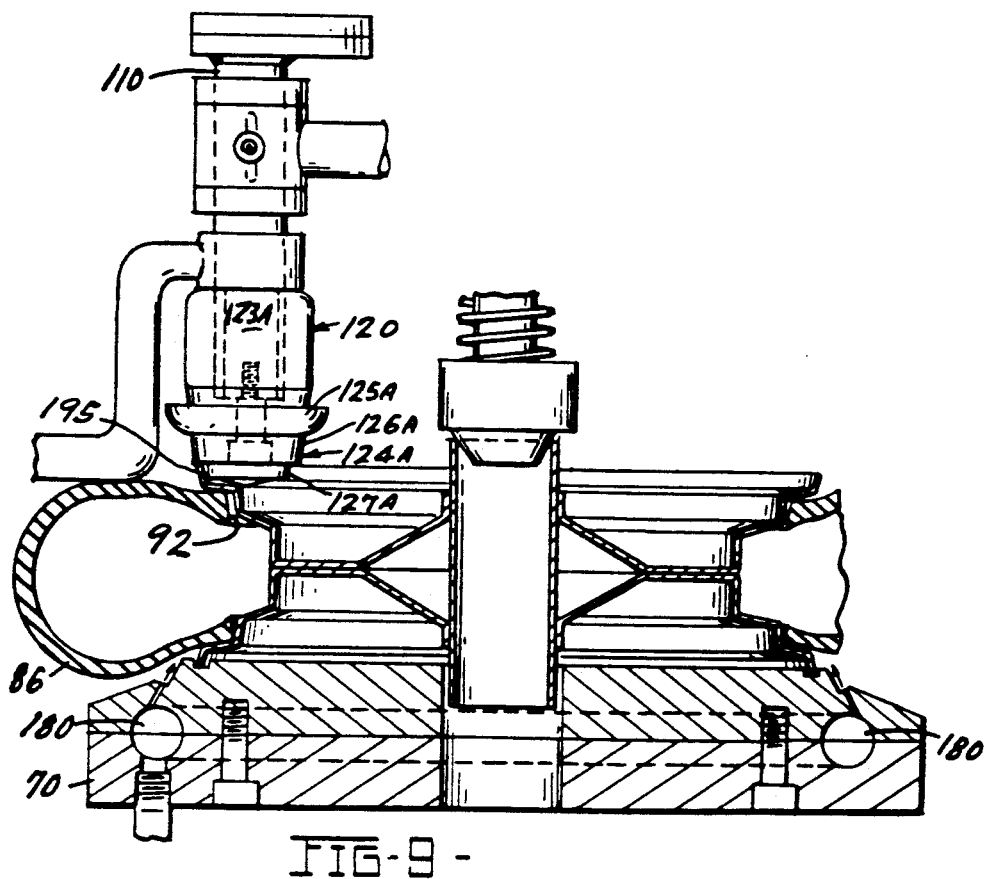

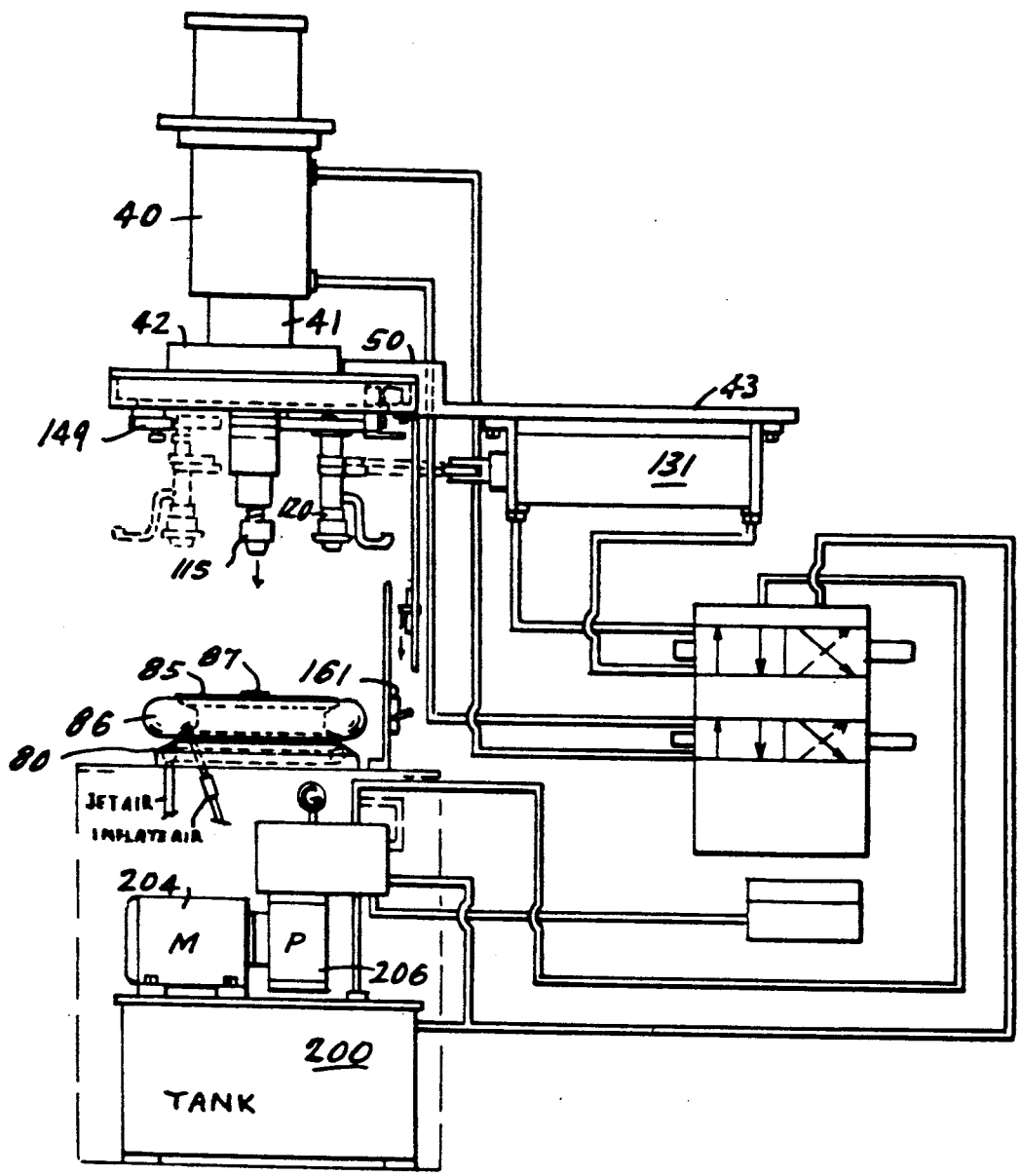
FIG-10-

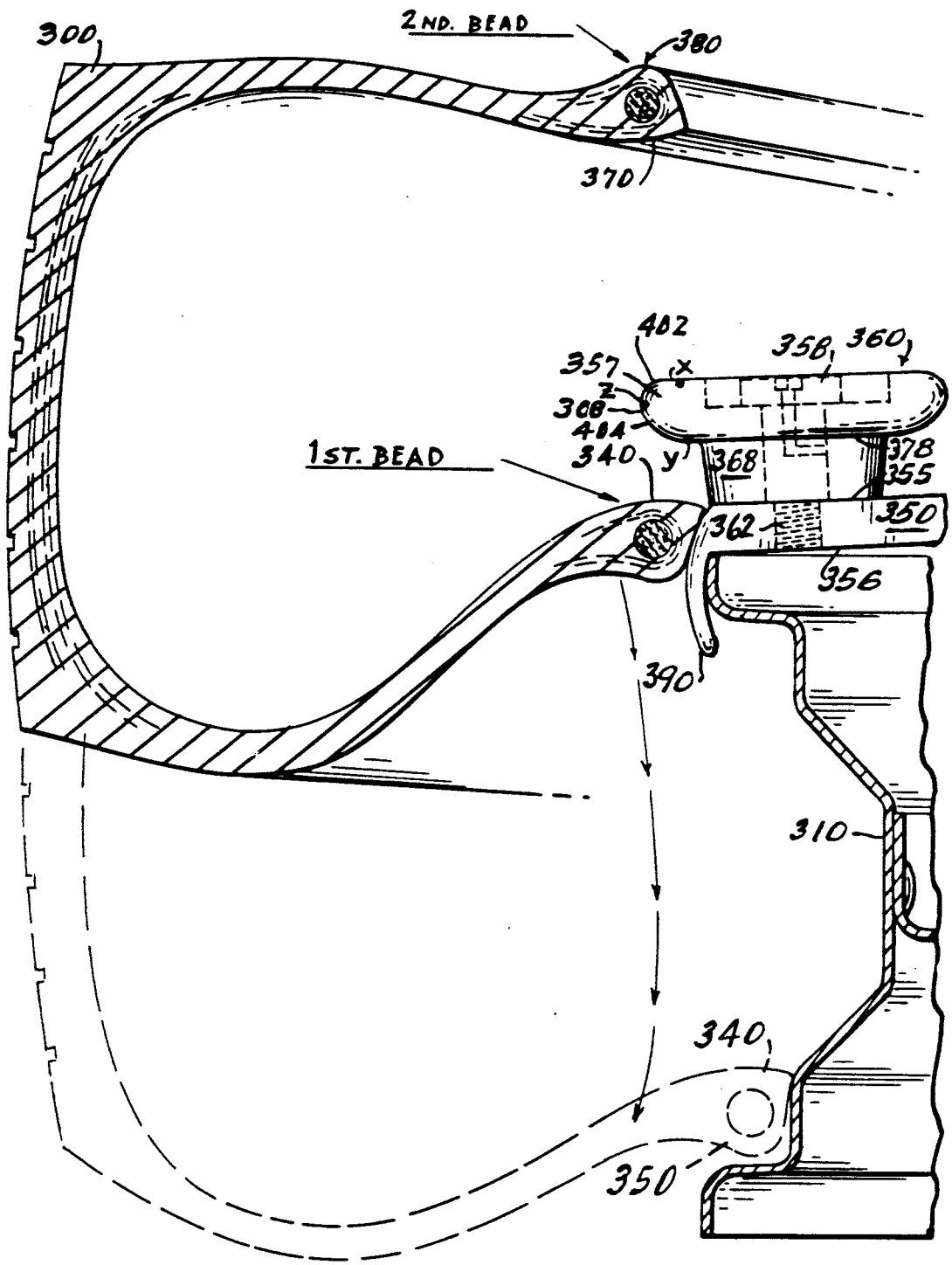
FIG-11-

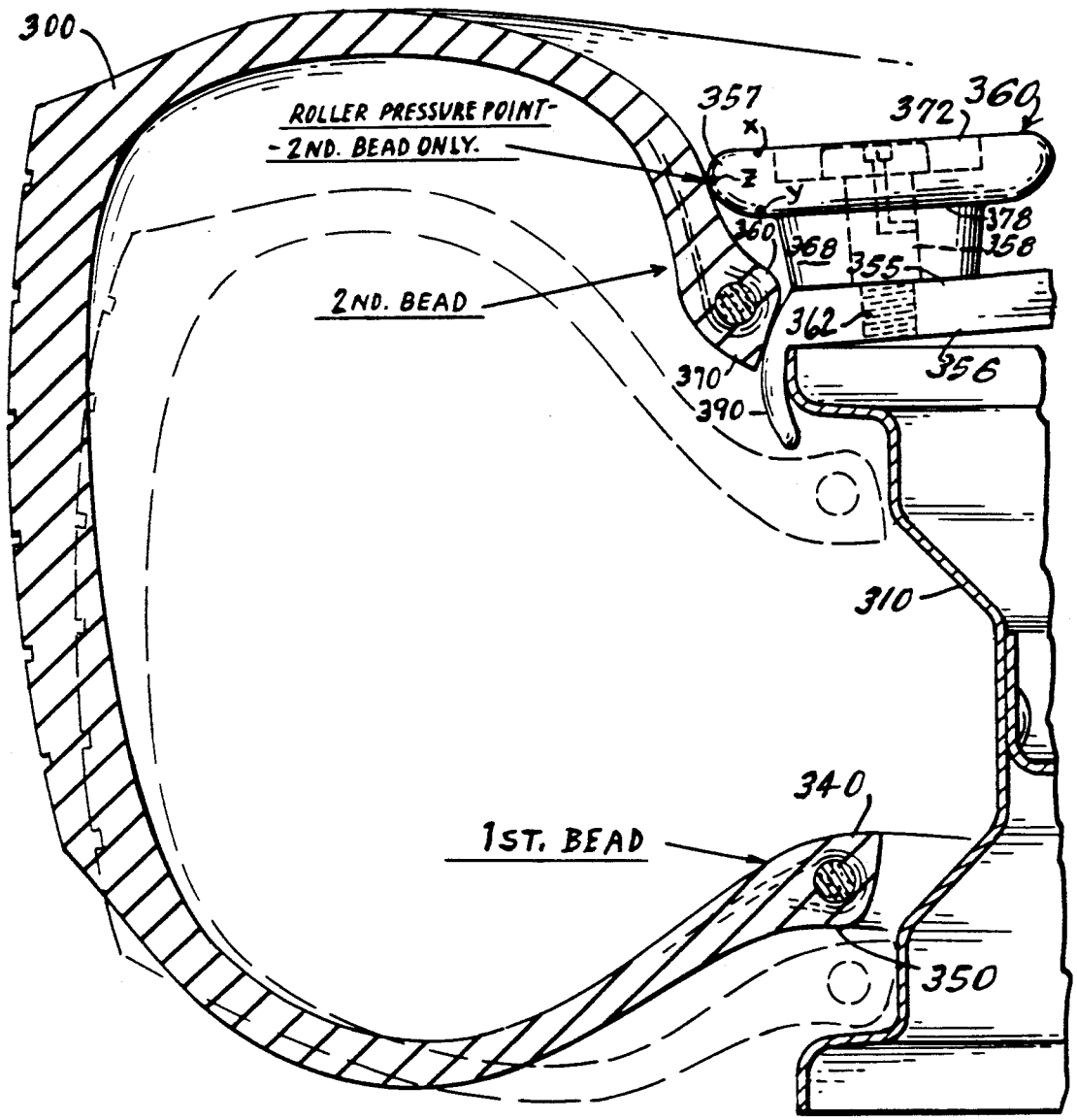
FIG-12-

METHOD FOR MANUFACTURING AN AUTOMATIC TIRE MOUNTING AND DEMOUNTING MACHINE ROLLER

DISCUSSION OF PRIOR ART AND BACKGROUND OF INVENTION

This application is a continuation application of my pending application Ser. No. 07/250,527 filed on Sept. 9, 1988, now abandoned, which is a continuation of my application Ser. No. 247,281 filed on Oct. 15, 1981, now abandoned.

The process of automatically or semiautomatically mounting pneumatic tires onto rims is performed by various methods and machines. The procedure involves, among other aspects, the difficult procedure of completing the sealing of the tire against the rim in order that intermittent air injected into the tire does not escape between the bead of the tire and the tire rim. Moreover, there is the added problem of ensuring that the machine mounting arm does not become entangled between the tire rim and the tire bead during or just after the mounting process. Several other operational problems are of prime consideration in the employment of automatic tire mounting machines. Some tire mounting machines known in the art have been conceived and utilized to overcome these problems. As indicated hereinbelow, the pertinent machines known in the art have not been of sufficient capability and versatility to solve these problems.

There have been a myriad number of machines conceived and used for automatic tire mounting purposes. In this light, there have been a number of machines manufactured on which tire is temporarily stretched by automatic means so that it can fit around the circumferential extent of the rim, with said automatic stretching force then being released as the tire appropriately fits circumferentially onto the rim. This latter machine process simply and solely affixes the tire circumferentially onto the rim so that it is properly positioned for the next successive step, namely the injection of air into the space between the rim and the tire. Such machines are generally not fully automatic and involve the necessity of the mentioned separate steps of mounting and inflating the tire. AS a consequence of such a dual step arrangment, the costs of operation are relatively high. This invention is conceived to overcome certain of these mounting difficulties and the following objects are directed accordingly.

OBJECTS

In view of the foregoing discussion of the proir art, the following are objects of the subject invention;

It is an object of the subject invention to provide an improved tire mounting machine;

Yet another object of the subject invention is to provide a tire mounting machine which is flexible and versatile in adaptation for mounting tires on rims of all shapes.

A further object of the subject invention is to provide an improved process of automatic tire mounting;

Still another object of the subject invention is to provide an efficiently operated tire mounting device;

Another object of the subject invention is to provide a more efficient process of mounting a tire on a machine;

An additional object of the subject invention is to provide an improved and relatively more versatile tire mounting device;

Another object of the subject invention is to provide an improved tire mounting roller;

Yet another object of the subject invention is to provide an improved tire mounting roller;

Yet another object of the subject invention is to provide an improved roller for mounting a tire;

Other and further object of the subject invention will become apparent from a reading of the following description taken in conjunction with the claim.

DESCRIPTION OF DRAWINGS

In the drawings:

FIG. 1 is an frontal perspective view of the machine incorporating the subject invention;

FIG. 2 is a perspective view of the tire mounting block shown with a tire rim thereon ready for the mounting process;

FIG. 3 is a front elevational view, of the tire mounting arms and mounting mechanism with the overall arm activating members shown in their particular operational stages;

FIG. 4 is an elevational view, from the bottom of the arm actuating mechanism and the circular track mechanism which constrains the movement of the mounting arms to respectively complementary, opposing arcuate movements;

FIG. 7 is a side elevational view, in section, of the tire mounting system;

FIG. 8 is the same cross sectional view as shown in FIG. 7, but with the tire shown as being mounted;

FIG. 9 is an enlarged view of an alternate embodiment of the subject invention;

FIG. 10 is a schematic drawing of the hydraulic system used in the subject invention.

FIG. 11 is a side elevational view of the subject roller shown mounting the lower tire bead;

FIG. 12 is a side elevational view of a mchine shown mounting the upper tire bead.

DESCRIPTION OF GENERAL EMBODIMENT

Figure 5:
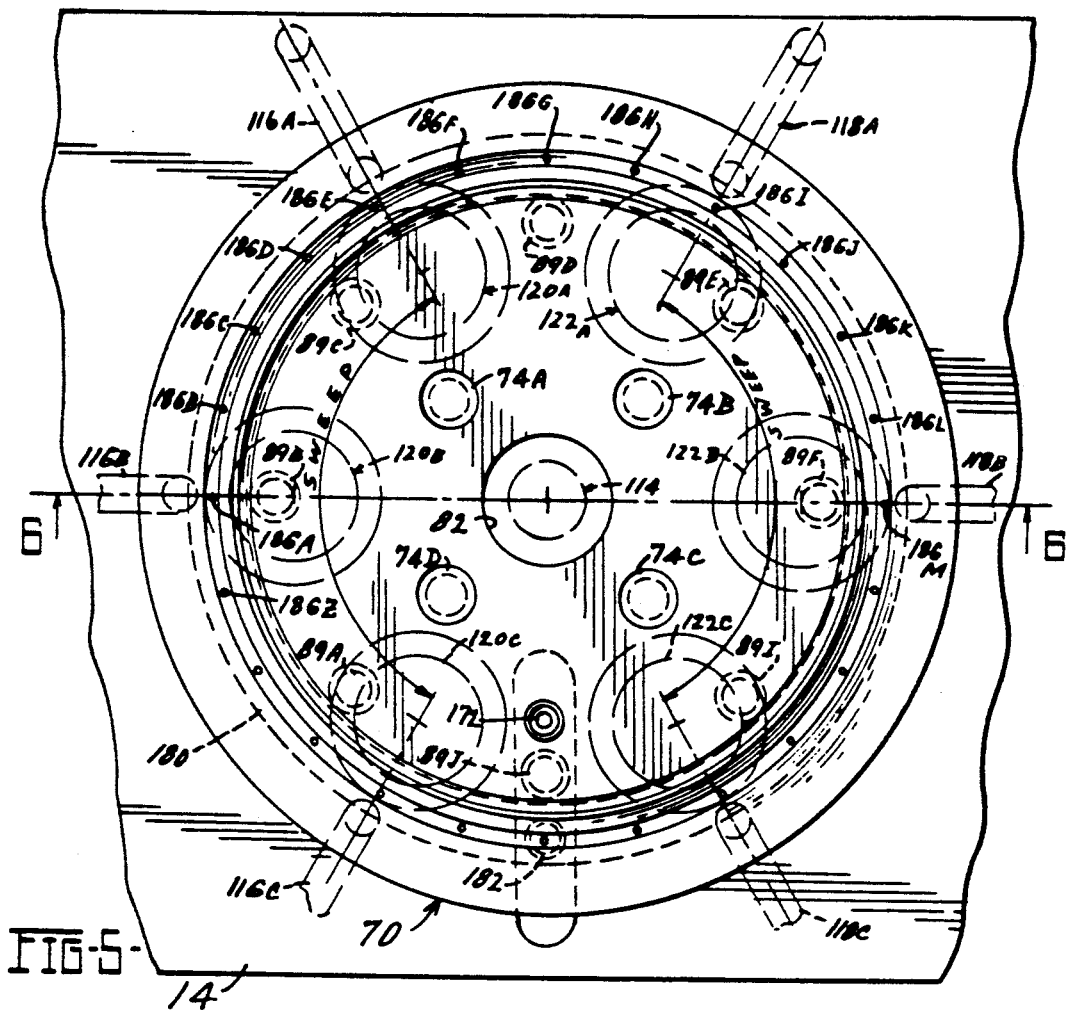
FIG. 5 is a top sectional view of the tire mounting block used in the subject invention.

The subject invention is an automatic tire mounting roller. Each roller member is basically a cylindrical member and has variable diameters along its vertical extent. Alternately stated, each roller, has circular shoulder members, extending completely around the periphery of the roller, such shoulder members having diameters which are larger or smaller than the basic diameter of the roller itself. The function of these respective shoulders is described as follows:

In general the three shoulders on each roller member are three distinct elements on the roller, and the areas at which these shoulders meet are distinctly defined neck areas wherein the lowermost portions of the respective shoulders are horizontally disposed or flat zones. This latter feature helps to distinctly define the three respective shoulder members and prohibits functional and operational interference between these respective shoulder members.

The upper shoulder on each rotatable roller engages the leading edge of the tire bead, thereby enlarging same, while the lower shoulder on the roller engages the inside diameter of the rim so as to roll therearound as the mounting arms move in their arcuate movement forwardly around the tire rim. During the foregoing process, the intermediate shoulder on the roller presses downwardly and outwardly against the upper tire bead (inside tire diameter) causing it to be pressed downwardly into position around the outside of the tire rim. As the mounting arm moves forwardly in its arcuate sweep, the shoulders in the rotating roller roll forwardly along the tire bead, expanding the tire bead and pushing the bead downwardly and inside the tire rim as a concurrent coordinated action.

DESCRIPTION OF PREFERRED EMBODIMENT

Referring now to the drawings in which a preferred embodiment is shown, it must be emphasized that the embodiment shown in the drawings and described herein is only one specific embodiment, and that the subject invention encompasses several possible embodiments, not all of which can be described herein. Therefore, description of a preferred embodiment herein shall not be considered as delimiting the general scope of the subject invention, as set forth in the claims hereto, as other embodiments and variations are envisioned.

Moreover, in describing the preferred embodiment of the subject invention, the following reference nomenclature will be used: First, the word "lower" will refer to those areas of the machine incorporating the subject invention, that are disposed towards the floor level upon which the base rests, while the word "upper" will refer to those portions of the machine lying thereabove. The word "vertical" will be used in reference to those structures that are oriented substantially up and down above, the base, while the word "horizontal" will be used in reference to those structures which are generally disposed in a direction perpendicular to the vertical orientation. The term "longitudinal central vertical axis" will refer to that axis of any part which extends vertically upward and downward through the center of the subject machine or a part thereof, dividing in a vertical direction said machine, or part, in a symmetrical fashion. Moreover, the word "horizontal central axis" will refer to that axis whch extends horizontally and symmetrically through the center of a part or structure on the subject machine.

Figure 6:
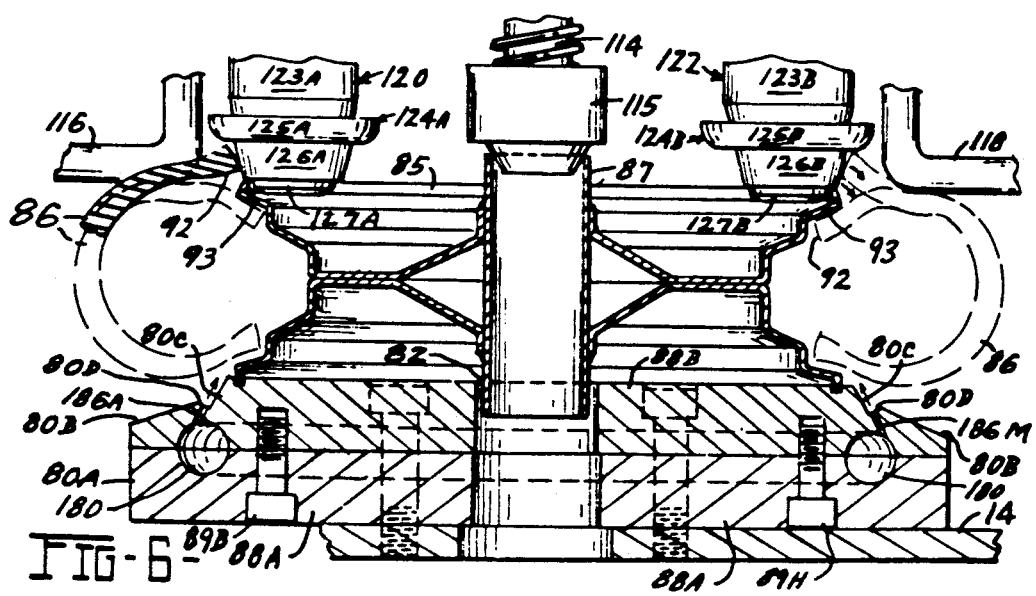
FIG. 6 is a sectional view of the mounting arms in their functional position.

One machine incorporating the subject invention is shown in FIG. 1, as tire mounting machine 10. For overall reference purposes in the ensuing description, FIG. 2 represents a tire mounting block 70 upon which a tire rim is placed for the process of mounting a flexible tire thereon. The tire to be mounted on rim 85 is affixed thereon by the mounting arms 120 and 122 shown in operation in FIG. 3. These latter mounting arms 110 and 112 move around the inside diameter of the tire in opposing and substantially semicircular movements to accomplish the process of mounting the tire on the rim 85. FIG. 4 is a drawing showing the detail of the actuating mechanism for the circular movement of the mounting arms and the detail of the circular track 129 constructed to constrain and guide the movements of the mounting arm members in their respectively designated semicircular movements. The mounting block 70 upon which the unmounted or bare rim 85 is secured for the subsequent tire mounting process is represented in a top elevational view in FIG. 5. In FIG. 6, a cross sectional view of the tire mounting block 70, the rim 85, and the mounting arms 110 and 112 reveals the functional positioning during mounting operations of the mounting arms with working rollers 120 and 122 respectively on each working arm 110 and 112. The process of placement of the rim 85 on the mounting block 70 is shown in FIG. 7, while FIG. 8 shows the rim 85 in a horizontal position for the tire mounting process, with the one rim exposed upwardly. FIG. 8 represents an alternate embodiment of a working roller, and FIG. 9 is a schematic view of the hydraulic system used in the subject invention.

Referring again in particular to FIG. 1, tire mounting machine 10 is comprised of a base member 12, which base member is adapted to rest on the floor. Basically, base member 12 is a parallelopiped shaped member having an upper working platform 14 and a lower surface 16. It is desirable that the upper working platform 16 be flat and generally horizontal in disposition. The working platform 14 serves as the primary working surface of the subject invention, as more particularly described hereinbelow.

The subject tire mounting machine can be affixed securely to the floor through floor anchors 17A, 17B, 17C and 17D, which in turn are permanently or semi-permanently affixed to the floor surface. Integrally affixed through the base member are two vertically extending pillars 20 and 22, extending from the bottom of base member 12 up through the working platform 14 through cylindrical support sleeves 23A and 23B on the working platform 14, and thence vertically upwardly above the working platform 14 of base member 12, as represented in FIG. 1. More particularly, the upwardly extending pillars 20 and 22 are mutually parallel members extending upwardly through the opposing ends of the working surface 14, as shown. Moreover, in the preferred embodiment each pillar 20 and 22 is cylindrically shaped for reasons more fully described hereinafter. These pillars 20 and 22 function as the primary support members of the working apparatus for tire mounting machine 10.

Integrally mounted on the respective upper ends of support pillars 20 and 22 is a horizontally disposed upper support beam 30. Upper support beam 30 is essentially a rectangularly shaped beam member which joins the upper ends of each pillar 20 and 22 in a supportive fashion. The undersurface 32 of beam 30 supports a vertically downwardly depending hydraulic cylinder 40. Hydraulic cylinder 40 is preferably joined to the middle area of undersurface 32 of upper support beam 30, so that such cylinder 40 is substantially equal distance from the respective end pillars 20 and 22, as readily determined from FIG. 1. Integrally affixed to the lower end of the piston 40 in hydraulic cylinder 40 is a horizontally disposed rectangular plate member 42, the lower surface of which is integrally affixed to the intermediately disposed horizontal frame member 40. Horizontal frame 40 is adapted to be vertically slidable up and down on the vertical pillars 20 and 22. More specifically, frame 50 has guide sleeves 52A and 52B affixed to the undersurface of the frame on each end thereof, as shown, which sleeves are adapted to receive and otherwise encircle respectively pillars 20 and 22. As a result, frame 50 is capable of slidable movement vertically up and down on pillars 20 and 22, as seen in FIG. 1, wherein the lowermost downward movement of frame is shown in phantom at 50A. As can be seen in FIG. 1 the intermediate sliding frame 50, as mounted on vertical pillars 20 and 22, through sleeves 52A and 52B, is slidably mounted so as to be capable of reciprocal vertical movement up and down pillars 20 and 22. The specific limits of this reciprocal vertical movement are shown in FIG. 1, as being between the uppermost position shown in full view and the lower most position being shown in phantom as position 50A. From the foregoing description, it can be seen that the intermediate reciprocation frame 50 moves up and down along sleeves in a movement which is depending in timing and distance on the actuation of cylinder 40 is affixed to the undersurface of beam. As will be described below, the working apparatus of machine 10 is integrally positioned to the undersurface 54 of frame 50 and the downward movement of frame 50 serves to position the working apparatus into position for actual tire mounting operations, and subsequently when the mounting is completed the frame 50 moves back upwardly.

Integrally attached to the working platform 14 of base member 12 is the tire mounting block 70. Tire mounting block 70 is a circular member integrally disposed in a horizontal manner and flush against the working platform 14 midway between the pillars 20 and 22. More particularly, the mounting block 70 is semipermanently affixed to the working platform 14 of base 12, so as to be immovable relative thereto. Moreover, in reference to FIG. 5, mounting block 70 has four circular threaded openings 74A, 74B 74C and 74D to receive appropriate locking screws to semipermanently affix the mounting block 70 to the working platform 14. The peripheral circumferential edge of the mounting block is comprised of multiple shoulders each with a different slope or gradient. More particularly, mounting block 70 has three distinct shoulder 80A has a gradient of ninety degrees, as it extends vertically upward perpendicular to the working platform 14. This shoulder 80A rises from the working platform 14 until it meets radially intermediate shoulder 80B. Radially intermeidate shoulder extends radially inwardly from the top of radially outer shoulder 80A at a gradient of about thirty degrees, as readily seen in FIG. 6. At the radially inner end of shoulder 80B, said latter shoulder drops downward a short distance as it extends radially inwardly, this short downwardly sloping ridge 80D is not technically considered a shoulder, however, the third shoulder 80C is the radially inner shoulder and it commences at the radially inner extent of ridge 80D and slopes upwardly at a gradient of approximately forty-five degrees as it extends radially inwardly. Radially inner shoulder ends at the top, horizontal surface 84 of tire mounting base 70. The radially inner shoulder 80C has a slope, in any event, which is steeper than that of intermediate shoulder 80B. In the center of the tire mounting block is a depressed cylindrically shaped depression 82 adapted to receive a hollow member such as wheel or tire rim hub of conforming diameter.

As seen in FIGS. 2 and 6, a base tire rim 85 of conventional constructional configuration with hub 87 is inserted on the tire mounting block 70 such that the tire rim 85 lies horizontally on tire mounting block with the one side of the rim being flush, in such horizontal position, against the upper surface of the tire mounting block 70, as shown. In such position rim hub 87 is inserted conformingly in depression 82 in block 70. It is in this latter position that a tire is placed on the rim 85, such a tire being shown in phantom in FIGS. 1 and 6, and again in FIG. 9.

In reference again to FIGS. 5 and 6, it is to be noted that the circular tire mounting block can be constructed as a two unit structure, although such a constructional configuration is not considered essential. In particualr, tire mounting block 70, as shown for the preferred embodiment, is comprised of separate circular plates, 88A and 88B, respectively the lower and upper plate members. Circular plate 88A is essentially a flat, regularly shaped plate, with side walls which are vertical, comprising most of shoulder 80A. The upper plate 88B is also circular, but with the sloping sides which form the upper part of shoulder 80A, and all of the sloping shoulders 80B and 80C. Upper and lower plates are secured to one another by a plurality of bolt members 89A, 89B ... 89J extending upwardly through appropriately machined receptable openings extending from the bottom of the lower plate member 88A.

As can be seen in FIGS. 1 and 3, depending downwardly from the undersurface of horizontal frame 50 are vertically disposed mounting arms 110 and 112. These two mounting arms 110 and 112 are longitudinally extending members and are parallel to one another, with a vertically depending positioning arm 114 disposed centrally between said two mounting arms, as shown. This cylindrically shaped, longitudinally extending member serves both to center the tire rim and to hold tire rim down against the mounting block as the tire mounting process is completed. Integrally attached and spring mounted on the bottom end of positioning arm 114 is a cylindrically configured centering post 115, the bottom end of which is adapted to seat in the upper end of tire rim hub 84, as represented in FIG. 6. More particularly, the centering post is spring loaded on positioning arm 114 such that it can move axially and resiliently up and down on positioning arm 114 in its precise centering and positioning operations.

The mounting arms 110 and 112 are also of cylindrical and longitudinally extending configuration. The longitudinal central axis of each mounting arm 110 and 112 is substantially perpendicular to the working platform 114, as seen in the drawings. Affixed and keyed to each working arm 110 and 112 is a laterally extending L-shaped tire holding arm 116 and 118 respectively, as shown in FIGS. 1, 3 and 6. These laterally extending tire holding arms are integrally attached approximately at the middle of each corresponding mounting arm 110 and 112, with a leg of such holding arm 116 and 118 depending vertically downwardly along the side of the arm for a distance to the corresponding mounting arm. As can readily be seen in FIGS. 3 and 6 at the bottom of the matching mounting arm 110 and 112, the respective holding arm 116 and 118 projects perpendicularly in L-shaped fashion, this perpendicular leg extending a distance substantially equal in length to the aforesaid vertical legal component. The functional aspects of tire holding arms 116 and 118 will be discussed in detail hereinbelow.

Fitted in semipermanent fashion of the bottom of each tire mounting arm 110 and 112 are tire mounting rollers 120 and 122 respectively These rollers 120 and 122 are rotatably mounted on the bottom of such arms so as to be freely rotatable about the vertical longitudinal central axis of each mounting arm. Each roller 120 and 122 substantially cylindrically shaped on its upper portions 123A and 123B respectively, and bell-shaped on its lower portions 124A and 124B respectively. Specifically, the lower bell-shaped portion of each mounting roller is comprised of three distinct shoulders, each with a different diametric extent and configuration. In particular, referring to roller 120, the uppermost shoulder, 125A is a circular flanged shoulder with a rounded, convex configuration on its downwardly facing side and a flat surface on its upper surface. Flanged shoulder 125A has a diameter, as seen, which is greater than the diameter of any other part of the roller 120. Middle shoulder 126A is rounded in a convex fashion and is smaller in diameter than flanged shoulder 125A the diameter of which decreases as it extends downwardly. The bottom shoulder 127A has the smallest diameter of the three shoulders, and moreover there is a sharp break between bottom shoulder 127A and middle shoulder 126A, as shown. In similar manner, shoulders 125B and 126B and 127B on mounting roller 122 are constructed as shoulders 125A, 126A, and 127A on mounting roller 120, as shown in FIG. 6. Referring to the particular roller embodiments shown in FIGS. 11 and 12, a tire mounting arm 350 is shown as straddling the upper part of a metal tire rim 310 upon which rim is to be mounted tire 300. As shown, in FIG. 11, the lower tire bead 340 (also designated first bead in the drawing) is mounted first while the upper bead 380 (also designated second bead) is installed after the installation of the first tire bead.

The mounting arm 350 is situated in such a position to touch the circumferential edge of the upper edge of rim 310, with an optional end hook 390 protruding vertically downwardly over the rim edge, as shown.

Mounted on the upper surface 355 of mounting arm 355 is mounting roller 360. In particular, mounting roller 360 is rotatably mounted for free rotation on shaft 362 which is integrally mounted on the arm 350, as represented. As a consequence, the roller 360 is free to rotate about shaft 362 relative to the mounting arm 350.

Moreover, the particular roller 360 shown in FIGS. 11 and 12 of an upper portion 357 and lower portion 368, with the reference perspectives of the upper and lower orientation shown in the drawings. The lower portion 368 of the roller 360 is formed in the shape of an inverted truncated cone, such that the truncated cone, such the upper part of the lower portion 368 has a geater diameter than the lower part of the lower portion 368 at rollers 360. As seen, the vertical sides of the lower portion 368 are linear, while the upper and lower horizontal surfaces are generally flat. The lower surface of the lower portion 368 of roller 360 thus abuts against the upper surface 355 of mounting arm 350, but with sufficient clearance so as not to touch against such upper surface of arm 350 as it rotates.

The upper porition 357 of the roller 360 is formed as a circular member, which is wider in comparison to the lower portion 368. As seen, the upper portion 357 has a lower surface 378 which is flat and integrally abuts or rests against the uppersurface of the lower portion 368, as shown. Additionally, the upper surface 358 of the roller 360 is also generally flat, while the laterally disposed or peripheral circumferential surface of the roller 360 is convex, as viewed in cross sectional configuration in FIGS. 11 and 12. As can be seen in FIGS. 11 and 12, and as stated above, the one preferred embodiment of the invention, the upper portion of the roller 360 is greater in diameter than the upper part of the lower portion 368; and in this preferred embodiment of the subject invention, such diametric difference is of such magnitude that a portion of the lower flat surface 378 of the upper portion 357 projects a minimal distance out beyond the upper part of the lower portion, as shown in the drawings. With this characteristic, the lower flat surface 378 of the roller 360 and the sides of lower portion 368 form a distinct cleavage and break, as shown in the cross sectional views of the rollers shown in the drawings.

The circumferential peripheral surface 300 of the upper portion 358 of roller 360 is convex all around its edge, as seen in the cross sectional views of FIGS. 11 and 12. This circumferential surface 300 is formed with a double radius, with the upper radius 402 of formation of surface 300 being distinct from the lower radius 404 of formation.

More specifically, as shown in FIGS. 11 and 12, the lower radius 404 is formed from a point of radius X located on the upper surface 358 of the roller 360, as shown commences inwardly at the same point Y and on the same diameter of the upper part of lower portion 368 of roller 360. And such radius stops at the most peripheral point Z on the outer convex surface 300. On the other hand, the upper radius 402 is commenced at point Z, all around the peripheral surface 308, and is drawn from point Y as shown in FIG. 10 and extends up to a point where it meets the upper flat surface 358 of roller 368. The upper radius 402 is formed on a 45° arc and is the smaller radius of the two double radii 402 and 404. Lower radius 404 is formed on a 60° arc from point X to point Z, wherein point Z is the largest diameter extendt of the upper portion 357 of roller 360 that serves up and out wardly at the extreme outwardly diameter of surface 300. This point Z on surface 308 represents the largest diameter of the roller 360, as shown. Radius 404 meets and conforms to radius 402 to blend into the desired double radius that is important to the functional part of the roller 360, as shown to provide the proper roller pressure point.

As can be seen from the foregoing discussion, the upper portion 357 of roller 360 has a convex circumferential surface formed by two and not one distinct radius. More particularly, the convex surface is so shaped that two separate radii 402 and 404 forms such circumferential surface, on the outer periphery. This structural arrangment allows the roller to more optimally engage the respective tire beads, as desired for efficient mounting of the tire on rim 310, as shown in the drawings. More particularly, the outer circumferential surface of the roller is manufactured by forming two separate radii that are formed separately with one distinct radius formed in the lower part of the outer circumferential surface and a second on the upper surface.

The subject invention is a method for manufacturing a tire mounting roller rotatably affixed to a tire mounting tool for mounting a flexible tire on a tire rim, and wherein such roller has a longitudinally extending vertical central axis about which such roller is symmetrically formed and about which vertical axis such roller is rotatably mounted for free rotation relative to such tire mounting tool, such method comprising forming a lower portion on such roller, such lower portion being shaped in the form of an inverted truncated cone with the upper part of such lower portion of such roller having a larger diameter than the lower part thereof, and forming an upper portion on such roller, such upper portion on such roller being formed respectively with an upper and lower part, with the lower part of such upper portion being adjacent to the upper part of such lower portion in a flush concentric manner and forming the outer surface of the upper part of the upper portion of such roller with two separate arcuate portions with the different center points which are within the upper portion on such roller, wherein each arcuate portion is of a different length and formed with a different radial length emanating from each such arcuate portion emanating from different points in the upper portion of said roller.

Integrally positioned on the undersurface 51 of frame 50 is a circular track 129 functioning to both hold and control the movements of the mounting arm members 110 and 112.

More particularly, the circular track 129 is horizontally disposed so that the plane formed by its circular path lies parallel to the plane of the upper working surface 14 of base member 10. In constructing the preferred embodiment of the subject invention it is considered optimal to construct the circular track with a diameter which is just slightly larger than the largest rim of the various tire sizes to be mounted with the subject machine, however, this latter described feature is not considered critical or necessary to the operational ability of the subject invention.

The upper ends of the mounting arms 110 and 112 are indirectly mounted (as described below) in the circular track 129 so that the sweeping, circular movements of the mounting arms are controlled by the track configuration and curvature. A horizontally and rearwardly extending support plate 43 is integrally affixed to the posterior side of the sliding frame 50, as shown in FIGS. 1 and 4. More specifically, plate 43 of flat dispostion extends rearwardly from the intermediate slidable frame member 50 whereby it lies approximately the same horizontal level as the intermediate frame 50, as shown. In particular reference to FIG. 4, which is, as noted, an elevational view of the circular track, viewed from the bottom (as if looking up thereat from working platform 14) a horizontally positioned hydraulic cylinder 131 is affixed to the undersurface of plate 42. The push rod 132 of cylinder 131, projecting in an anterior, as opposed to posterior, direction is connected to a clevis pivot member 133, mounted in bushing 134, to which clevis member is pivotally mounted two horizontally extending connecting rods 135A and 135B. More particulary, the clevis pivot member 133, when also viewed in FIG. 3, is desirably constructed as a U-shaped member through which is inserted a freely rotatable member 136. The connecting rod members 135A and 135B are of general cylindrical configuration except in those areas of rods 135A and 135B adjacent to where the connecting arms are joined at clevis pivot member 133. Specifically, at the latter areas each connecting rod 135A and 135B is semicircular, with half of its diametrical extent cut off, so that the respective rods 135A and 135B, at this juncture, having opposing flat surfaces to facilitate one rod sliding over the top of the other in an articulative fashion, at this pivot juncture. This latter arrangement avoid interference between the two connecting rod members when they are actuated, as described more fully hereinafter.

As shown in FIGS. 3 and 4, the hydraulic piston 131 is disposed horizontally in the platform 43 so that when said cylinder is actuated, it causes the piston rod 132 to move forward, in a horizontaly plane just beneath platform 43. As said piston rod 132 moves forward, it exerts force on clevis 133, in turn causing the clevis pivot member to move forwardly in the same direction as piston rod 132.

As the clevis pivot member 133 moves forward, to the left in FIGS. 3 and 4, the forward movement of the clevis exerts such forward directional force on the right or posterior ends of the connecting rods 135A and 135B. The forward, horizontally directed force vector on the ends of connecting rods 135A and 135B causes them to move forwardly also, but because of the clevis connecting, the connecting rods 135A and 135B will diverge from one another as they move forward. A more detailed description of the construction and interrelationship of said connecting rods is set forth immediately below.

Each connecting rod 135A and 135B extends horizontally forwardly from pivot member 133, with the connecting rods forming a conjoined V-shaped appendage as shown in FIG. 4. Integrally mounted on the respective ends of connecting arms 135A and 135B are the mounting arms 110 and 112. More precisely, at the end of connecting rods 135A is integrally mounted a sleeve member 136A, into which is rotatably mounted vertically depending working arm 110. The sleeve 136A is joined in a perpendicular manner to the working arm 110 at an area between the joinder point of tire holding arm 116 and circular track 129. In similar manner, mounting arm 112 is rotatably mounted sleeve 136B affixed on the end of connecting rod 135B.

As is graphically indicated in FIG. 3, the connecting rods 135A and 135B join the vertically depending mounting arms 110 and 112 at a height which is approximately just above the middle of such mounting arms. Rotatably mounted on the respective upper ends of mounting arms 110 and 112 are upper bushings 140A and 140B of cylindrical dispostion. Integrally affixed to these buhsing members 140A and 140B are horizontally disposed, and longitudinally, extending guide arms 145A and 145B. Guide arms 145A and 145B have at the respective ends opposite to the bushing members 140A and 140B, roller members 147A and 147B mounted therein which are equipped to roll around the inner guide rails of circular track 129 indicated and represented in FIGS. 3 and 4. As stated, guide arms 145A and 145B are rotatably mounted to working arms 110 and 112 respectively through bushings 140A and 140B, and by this feature move the mounting arms 110 and 112 in a mutually complimentary circular path, such path originating at the position to the right shown in FIG. 4, to the positions shown on the left, in phantom, in the same figure. More specifically, referring to FIGS. 3 and 4, as the hydraulic cylinder 131 is actuated, the rod 132 is thrust forward, moving forward as a result the clevis pivot member 133. As the pivot member 133 rides forward, it pushes connecting rods 135A and 135B forward, also to the left in FIG. 4, and as rods 135A and 135B move forward, each will diverge from one another. This forward movement of the connecting rods 135A and 135B causes in turn working arms 110 and 112 to move forward, also, but the forward movement of working arms 110 and 112 is constrained and controlled by the effect of guide arms 145A and 145B. Specifically, since guide arms 145A and 145B are in turn restrained in their respective movements by the roller members 147A and 147B engaging the track 129, the net effect is that each mounting arm 110 and 112 each move forward in a semicircular sweep; one mounting arm 110 moving counterclockwise, as viewed in FIG. 4, while the other arm moves in a complementary, but opposite, clockwise sweep, as shown. The resultant movement of the respective mounting arms 110 and 112 is an approximate 120 degree sweep for each arm, and these respective movements function, as will be discussed, as a part of the tire mounting process to install the tire bead around the complete circumference of the tire rim.

As seen in FIG. 4, the guide arms 145A and 145B extend radially inwardly a short distance from the bushings 140A and 140B and these extensions 148A and 148B are integrally affixed to a sleeve 149 conjoined rotatably around the top of the positioning arm 114 through sleeve 149. Moreover, machined into each guide arm extension 148A and 148B is a longitudinally extending slot, 140A and 140B which lies parallel to the longitudinal central axis of each respective guide arm 145 and 145B. These slots receive and allow for longitudinal extension or contraction of the guide arms 145A and 145B so that a shortening or lengthening the latter arms serves to decrease or increase, as desired, the effective diameter of the sweep of mounting arms 110 and 112 for different tire diameters.

In mounting the tire 86 on the rim 85, it is essential that the mounting rollers move through a total cooperative circular sweep that approaches 270°; this means that the total arcuate sweep of each mounting roller should be about 120° arcuate distance, with each roller 120 and 122 on each mounting arm moving in opposing arcuate directions from the starting positions shown to the left in FIG. 4. Thus, when the mounting arms 110 and 112 are moved forwardly by connecting rods 135A and 135B, one arm 110 will move counterclockwise from the position shown in FIG. 4, through the arcuate path schematically shown in FIG. 4, 120° to a position shown in phantom to the right in FIG. 4. Similarly, mounting arm 112 will move 120° in an arcuate path in a clockwise direction over the path shown schematically, as shown, reaching the position on the left shown in phantom. These respective complementary motions of the mounting arms 110 and 112 will cause the mounting rollers to move a corresponding path, and direction, as part of the tire mounting process, more fully described below. As indicated in FIG. 4, as the guide arm 145B moves forward in its described arcuate path, it will hit limit switch 149 causing same to actuate the air inflation process described below. As indicated in FIG. 4, the limit switch 149 is affixed to the front undersurface of frame 50.

The above described circular movements of the mounting arms 110 and 112 are designed to create an effective circumferential evolutionary and working movement of said arms about the upper circumferential periphery of the tire rim 85. By using this circumferential movement, each mounting arm serves to progressively place the upper bead of a horizontally disposed tire over the upper circumference of the rim. This placement of the tire over the rim thus progresses circumferentially in a progressive manner on each side of the rim, as discussed below.

In positioning a tire 86 on a rim 85, as shown in FIGS. 7 and 8, the rim 85 is placed on the tire mounting block 70, as shown in the position in these two indicated drawings. Once the rim 85 is placed horizontally on the tire mounting block, a tire is placed over the rim in an inclined position as shown in FIG. 7, surrounding a portion of the tire rim, with one portion of one side thereof resting on the top surface of the working platform 14 adjacent the rear of the platform. The other end of the tire in inclined upwardly so that the lower side of the tire, near such upper inclined end, rests on the top front side of rim 85, as shown. Once the tire 86 is so positioned the hydraulic cylinder 40 is actuated. This in turn causes the sliding frame 50 to be lowered, as shown in FIG. 1. This downward movement of frame 50 in turn lowers the mounting arms 110 and 112, along with the positioning of arm 114, and as the depending actuator arm 159 on frame 50 passes limit switch 160, mounted on vertical stanchion at the rear of working platform 14, it causes thereby cylinder 131 to be actuated. Once cylinder 131 is actuated, as discussed above, vertical mounting arms 110 and 112 move forward in the respective complementary semi-circular motions as discussed above. Additionally, as the mounting rollers 120 and 112 move downwardly, the lower side of each upper roller shoulders 125A and 125B respectively engage the leading edge of the inside diameter of the tire or tire bead 92, as shown in FIG. 7, while the bottom shoulder 127A and 128B engages the inside of the outer edge of the upper exposed tire rim, as shown in FIG. 6. By this latter feature, the mounting rollers 120 and 122 will always ride inside the upper rim diameter, with bottom shoulder riding against the inside of the rim, thus keeping the rollers always inside and above the tire rim, and not between the outside of the tire rim 85 and the tire bead. The intermediate shoulder 126A and 126B urges the tire bead radially outwardly behond the rim periphery while lateral tire holding arms 116 and 118 push or hold the tire down as it is being mounted, as seen in FIG. 6. Thus, as rollers 120 and 122 move downwardly and rotate upon the forward movement of mounting arms 110 and 112, the forward rolling motion of rollers 120 and 122 along the rim 85 and tire bead 92 causes the tire to be progressively installed in a circumferential manner, from front to back of the rim, around the rim 85 without requiring the rollers 120 and 122 to be positioned at any time between the tire and the rim. Thus, in specific functional dispostion, each roller has several purposes. First, the lower face of upper shoulders 125A and 125B engages the leading edge of the tire bead and thence pushes it downwardly beneath the rim diameter. Middle shoulder 126A and 126B on each roller continues to urge the tire bead radially outwardly so that the tire bead will fit around the rim diameter, and lower shoulder 127A and 127B functions to keep the roller inside the rim diameter, so that it does not get positioned between the tire rim and the tire and interfere with the mounting process.

The foregoing constructional arrangement for the rollers 120 and 122 together with the other characteristics of the tire mounting machine 10 described herein provides a flexible machine assembly which is adaptable for mounting tires of a wide range of sizes on rims on a broad range of shape and size. In this regard, the tire mounting machine 10 as representing the preferred embodiment of the subject invention is constructed primarily for the installation of tires on rims of smaller diameters, such as small tractors or wheelbarrow tires. However, with very minimal or slight modifications the tire mounting machine 10 can be used to install tires of any size or configuration or drop center rims, as used in the automotive industry. In the event of installation of tires on drop center rims, the salient working and mounting elements, as described above, will remain unaltered in basic structure.

The tire mounting lock 70 incorporates two physical elements for the air inflation proccss. The two features allow a tire 86, once installed on the rim 85, to be inflated almost instantaneously as the final stages of the installation process is being completed. This latter simultaneous feature obviates the necessity of a separate step or machine station for this inflation process.

The specific physical features of this dual tire inflating system, are as stated, incorporated in the tire mounting block 70, with the following described elements. A vertically upwardly extending air hose 170 arises from a compressed air source, not shown, up through base member 12, and has an opening thereon which is joined to air inlet 172, as shown in FIG. 2. The air inlet 172 is aligned with the valve 178 in rim 85, so that as compressed air is passed through hose 170 it is directed immediately to the areas inside the tire, between the rim 85 and the tire 86. The latter system serves as the primary air injection system for tire mounting machine 10. A supplementary air injection system is provided as follows: A circular channel 180 of cylindrical dispostion is integrally machined into the internal areas of tire mounting block 70, as shown in FIGS. 5 and 6. This circular channel 180 is a continuous circular tunnel which communicates with a upwardly extending air hose member 182, also connected to the air pressure source in base member 12. The circular tunnel member 180 in turn communicates with a plurality of upwardly extending ventricles (jets) 186A; 186B . . . 186Z to areas outside the mounting block 70. These ventricles are spaced from one another in an uniform manner around the block 70 and such ventricles extending upwardly from tunnel 180 between shoulders 80B and 80C, as shown in FIG. 6. More particularly, each ventricle 186A . . . 186Z extends in an inclined direction, inwardly and upwardly from tunnel 180 in a direction which is parallel and aligned with the outer extremity of radially inner shoulder 80B as shown in FIG. 6. By this latter constructional relationship, air passing upwardly from air hose 182, passes directly to channel 180 and thence around such channel and subsequently up through ventricles 186A, 186B . . . 186Z. As can be seen as the air passes upwardly the ventricles 186A, 186B the air will flow directly along the side of radially inner shoulder 80B, into the inside areas between the bottom bead of the tire 86 and the tire rim 85, as schematically reprsented in FIG. 6. As can be seen by this dual air injection arrangment, very minimal amounts of air will be wasted because of the direct vectoring of the air flow through the ventricles 186A, 186B . . . 186Z, up directly to the areas inside the tire and the rim. Moreover, the air injection system is automatically timed to be generated upon actuation of the same limit switch 160 which actuates the downward movement of the working arms 110 and 112.

The tire mounting machine 10, as shown, is operated electrically, with appropriate electrical control systems situated in control box 200, shown in FIG. 1. The operational movments of all moving machine elements are actuated through a hydraulic system schematically represented in FIG. 10. In particular, a reservoir tank 204 is located in base 12, with motor 206 and pump 208 connections also located at the bottom inside of these member 12 as shown. Hydraulic cylinders 131 and 40 are appropriately coordinated for actuation in the subject machine through the closing of limit switches 149 and 161 shown in the drawings. The operational features and constructional characteristics of the foregoing hydraulic system is generally of conventional disposition.

The foregoing described tire mounting invention, as described thusly adaptable for use in installing any type of tire on any type of rim, with minor modifications being appended. For example, as shown in FIG. 9, the subject machine can be used on reverse flange rims also. At noted, the subject invention utilizes novel mounting rolling structures along with simultaneous air injection devices to render the tire mounting process more efficient. Moreover, the foregoing described invention is only one embodimetn of several potential structures, and the following claims are not to be limited by the specific description of one such embodiment.

In summary, the subject invention is a method for manufacturing a tire mounting roller rotatably affixed to a tire mounting tool for mounting a flexible tire on a tire rim, and wherein such roller has a longitudinally extending vertical central axis about which such roller is symmetrically formed and about which vertical axis such roller is rotatably mounted for free rotation relative to such tire mounting tool, such method comprising forming a lower portion on such roller, such lower portion being shaped in the form of an inverted truncated cone with the upper part of such lower portion of such roller having a larger diameter than the lower part thereof, and forming an upper portion on such roller, such upper portion on such roller being formed respectively with an upper and lower part, with the lower part of such upper porton being adjacent to the upper part of such lower portion in a flush concentric manner and forming the outer surface of the upper part of the upper portion of such roller with two separate radii with a common center point which is within the upper portion on such roller.

I claim:

1. A method for manufacturing a tire mounting roller rotatably affixed to a tire mounting tool for mounting a flexible tire on a tire rim, and wherein said roller has a longitudinally extending vertical central axis about which said roller is symmetrically formed and about which vertical axis said roller is rotatably mounted for free rotation relative to said tire mounting tool, said method comprising:

(a) forming a lower portion on said roller, said lower portion having an upper part and a lower part and said lower portion being shaped in the form of an inverted truncated cone with the upper part of said lower portion of said roller having a larger diameter than the lower part thereof;

(b) forming an upper portion on said roller, wherein said upper portion has an outer surface, said upper portion on said roller being formed respectively with an upper and lower part, with the lower part of said upper portion being adjacent to the upper part of said lower portion in a flush concentric manner;

(c) forming the outer surface of the upper part of the upper portion of said roller with two separate arcurate portions, each such arcuate portion having a different center point being located within the upper portion on said roller, each said arcuate portion being of different length.

2. A method for manufacturing a tire mounting roller rotatably affixed to a tire mounting tool for mounting a flexible tire on a tire rim, and wherein said roller has a longitudinally extending vertical central axis about which said roller is symmetrically formed and about which vertical axis said roller is rotatably mounted for free rotation relative to said tire mounting tool, said method comprising:

(a) forming a lower portion on said roller, said lower portion having an upper part and a lower part and said lower portion being shaped in the form of an inverted truncated cone with the upper part of said lower portion of said roller having a larger diameter than the lower part thereof;

(b) forming an upper portion on said roller, wherein said upper portion has an outer surface, said upper portion on said roller being formed respectively with an upper and lower part, with the lower part of said upper portion being adjacent to the upper part of said lower portion in a flush concentric manner;

(c) forming the outer surface of the upper part of the upper portion of said roller with two separate arcuate portions being specifically a first arcuate portion and a second arcuate portion, with the center point for the first arcuate portion being located at a different location than the center point for the second arcuate portion.

* * * * *